Feb. 18, 1969   D. TILLAY ETAL   3,428,019
DROP MARKER
Filed Sept. 19, 1966
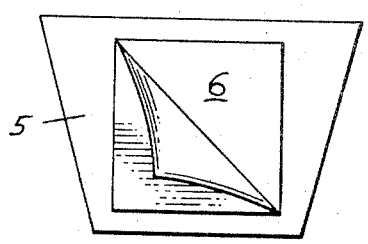
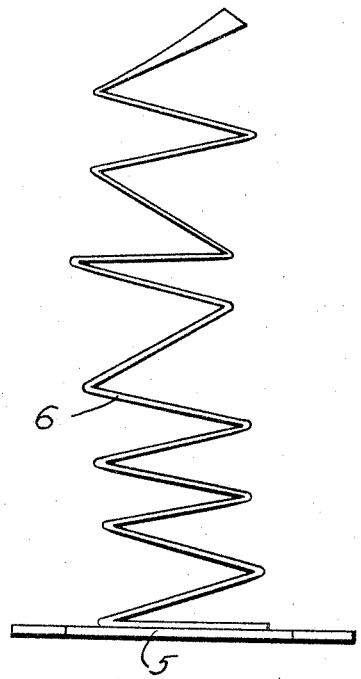
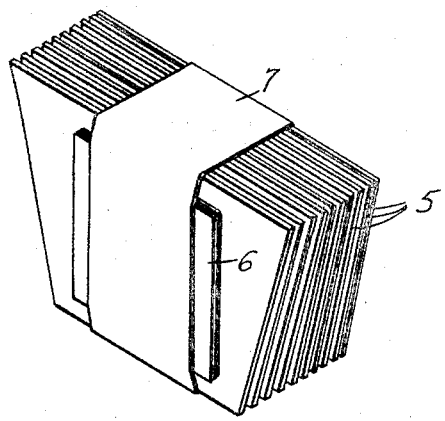
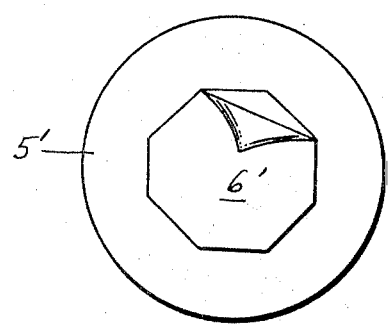
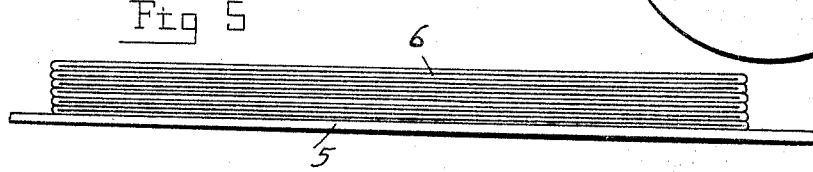
INVENTORS.
DALE TILLAY
BY MARVIN O. BLEVINS
*Wells & St. John*
ATTYS.

United States Patent Office 3,428,019
Patented Feb. 18, 1969

3,428,019
DROP MARKER
Dale Tillay, Rte. 1, and Marvin O. Blevins, Rte. 4,
both of Walla Walla, Wash. 99362
Filed Sept. 19, 1966, Ser. No. 580,316
U.S. Cl. 116—124
Int. Cl. G09f 1/04
8 Claims

ABSTRACT OF THE DISCLOSURE

A marker is described for dropping from an airplane to mark specified ground areas. The marker includes a stiff flat base member with exposed edge portions that can be used to separate individual markers readily from a stack of them, together with a flexible folded streamer of less area when folded and attached to the base member so as to unfold in the air as a streamer when the marker is discharged into the air from an aircraft and descend rapidly to mark the specified ground area.

---

This invention relates to a drop marker for use in marking areas from an aircraft. It is particularly adapted for use in applying various materials to land areas by spraying, although it is not specifically limited thereto. In the spreading of fertilizers, seeds, pesticides, and weedicides, and other materials which do not themselves so color the terrain as to indicate whether the area has been treated, the problem of marking the terrain to indicate the path taken by the aircraft exists.

It is the purpose of this invention to provide a marker for the terrain which combines compactness for carrying on the aircraft in large quantities and expandability while falling with a high degree of probable visibility from the air once the marker has landed, and which is of comparatively low cost.

It is a further purpose of this invention to provide a marker of the character just described which deteriorates on the ground with no permanent damage to the vegetation and soil.

More specifically it is a purpose of our invention to provide a marker to be dropped from aircraft which embodies a stiff flat base member with exposed edge portions that can be used to separate the individual markers readily from a stack of them, together with a flexible folded streamer of less area when folded attached to the base member so as to unfold in the air as a streamer when the marker is discharged into the air from an aircraft.

The nature and advantages of the invention will appear more fully from the following description and the accompanying drawings wherein a preferred form of the invention is shown. The drawings and description are illustrative only, however, and are not intended to limit the scope of our invention except insofar as it is limited by the claims defining the invention.

In the drawing:

FIGURE 1 is a plan view of a marker embodying our invention;

FIGURE 2 is a side view of the marker showing how it expands while falling;

FIGURE 3 is a perspective view of a small bundle of the markers showing how they may be packaged for shipping and loading on the aircraft;

FIGURE 4 is a view like FIGURE 1 of a marker with a modified shape of base; and

FIGURE 5 is an enlarged side edge view of the marker with the thickness of the streamer strip exaggerated somewhat.

Referring now to the drawings, our invention comprises a marker which is made up of two simple parts, one of which is a base 5 which is stiff, and capable of retaining its shape when discharged into the air from an aircraft. This base may be of any suitable material, but for most of the intended usages, it is best made of a vegetable fiber so that when it is left on the ground it will break up gradually and become a part of the soil. Cardboard is a good material since it is fairly heavy and when exposed to weather it softens and breaks up. Felted wood pulp compacted enough to hold the flat shape is satisfactory. For practical reasons the base 5 should be of the order of .05 inch to .125 inch thickness.

Each base 5 has affixed thereto an elongated strip 6 of flexible sheet material. One end of the strip 6 is glued to the base 5 and the strip is folded upon itself several times so that when expanded it will be from about five feet to about 100 feet long. The length is varied to suit the terrain and the crop. For example, a forested area requires long markers. We find that commercial tissue paper of a quality and thickness similar to facial tissue is excellent for our purpose. This streamer strip 6 may be plain white or of any desired color tint to suit the conditions where it is used for maximum visibility from the air. For better visibility under poor light conditions it may have a luminescent coloring impregnated therein. The strip 5 may, of course, be made of woven fabric such as cheesecloth where a longer durability of the marker is desired.

In order to make the markers discharge properly from a dispensing means on an aircraft the base 5 is enlarged with respect to the folded strip 6 so that certain portions of the base 5 extend beyond the edges of the folded strip 6 to be engaged by retaining and ejecting elements of the dispensing means. The shapes of the marker illustrated in the drawings show the folded strip 6 as being arranged to expose an area of the base 5 all around the strip 6. This is the preferred arrangement, although other arrangements can be provided to accommodate various dispensing methods.

The base 5 being heavier than the folded strip 6 and of larger area, takes the lead when dropped from the aircraft and the air stream unfolds the strip 6 which is soft and readily expandable. The base 5 generally reaches the ground first and the strip settles stretched out so that a rather large surface area is exposed to view from the air. The strip 6 need not be of the same width throughout, although for the economy in manufacture this is the preferred shape. FIGURE 4 illustrates how a circular disk base 5' is used with a strip 6' of varying width. Here the strip is so cut that very little waste occurs in cutting up tissue paper stock into strips. This strip 6' is more apt to tear off because of the narrow sections at the folds, but but it also presents a more irregular surface to view from the air. For most uses we prefer the strip of uniform width shown in FIGURES 1–3.

The polygonal non-rectangular shape of the base 5 lends itself to quick correct positioning in a dispenser so that it may be held at the sides before dispensing and merely raised to free the sides for discharge.

FIGURE 3 shows how the markers may be bundled for convenience in loading them into a dispenser and in shipping. The band 7 is torn off when the markers are loaded into a dispenser.

It is believed that the nature and advantages of our invention will be apparent from the foregoing.

We claim:

1. A drop marker for use in marking ground areas from an aircraft comprising:
   a base member of stiff sheet material;
   a streamer strip of soft flexible sheet material having a large surface area with one end of the strip affixed to the base member and folded to and fro in a flat condition against said base member with the other end free;

said base member having a portion of its surface to which the strip is attached that is not covered by the folded strip to facilitate the handling of the drop marker; and said base member being heavier than the streamer strip so that when the drop marker is dropped from the airplane the base member will unfold the streamer strip as the marker is descending to the ground to expose the large surface area of the strip to view from the air to visually mark the ground areas where the marker lands.

2. The marker defined in claim 1 wherein the peripheral border of the folded streamer strip lies wholly within the border of the base member to provide exposed edge portions of the base member to facilitate the separation of the marker from a stack of markers.

3. The marker defined in claim 1 wherein the base member is made of a material that breaks up upon exposure to the atmosphere on the ground.

4. The marker defined in claim 1 wherein the base member is made of a vegetable fiber board.

5. The marker defined in claim 1 wherein the streamer strip is composed of a flexible sheet of vegetable fiber.

6. A drop marker for use in marking ground areas from an airplane comprising:

a base member of stiff sheet material;

a streamer strip of soft flexible sheet material having a large surface area with one end of the strip affixed to the base member and folded to and fro in a flat condition against said base member with its other end free; and said base member being heavier than the streamer strip so that when the marker is dropped from the airplane over a specified area the marker will rapidly descend to the ground area to accurately visually mark the ground area, with the base member unfolding the streamer strip as the marker descends to expose the large surface area of the strip to view from the air.

7. A drop marker as defined in claim 6 wherein the length of the streamer strip is between 5 feet and 100 feet.

8. A drop marker as defined in claim 6 wherein the base member has exposed edge portions that extend outward from the folded streamer strip to facilitate the separation of the drop marker from a stack of drop markers.

References Cited

UNITED STATES PATENTS

| | | | |
|---|---|---|---|
| 1,564,152 | 12/1925 | Thomson | 35—56 |
| 1,798,052 | 3/1931 | Additon | 350—99 |
| 1,985,678 | 12/1934 | Hand | 281—5 |
| 2,149,530 | 3/1939 | Loweth | 282—11.5 |
| 2,349,984 | 5/1944 | Ostrander | 46—146 |
| 2,360,516 | 10/1944 | Schmidling. | |
| 2,610,868 | 9/1952 | Flament | 282—11.5 |
| 2,800,099 | 7/1957 | Baker | 116—63 |
| 3,059,362 | 10/1962 | Scherotto | 40—124.1 |
| 3,280,549 | 10/1966 | Hsu | 116—124.9 |
| 3,322,093 | 5/1967 | Goland et al. | 116—63 |

LOUIS J. CAPOZI, *Primary Examiner.*

U.S. Cl. X.R.

340—25